(12) United States Patent
Baker et al.

(10) Patent No.: US 9,001,912 B2
(45) Date of Patent: Apr. 7, 2015

(54) MEASURING CHANNEL SIGNAL TO NOISE METRIC USING CONSTELLATION DATA

(71) Applicant: Tektronix, Inc., Beaverton, OR (US)

(72) Inventors: Daniel G. Baker, Beaverton, OR (US); Lakshmanan Gopishankar, Portland, OR (US); George W. Tusing, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 13/971,736

(22) Filed: Aug. 20, 2013

(65) Prior Publication Data

US 2014/0056342 A1    Feb. 27, 2014

Related U.S. Application Data

(60) Provisional application No. 61/692,705, filed on Aug. 24, 2012.

(51) Int. Cl.
| | |
|---|---|
| *H04L 5/12* | (2006.01) |
| *H04B 17/00* | (2006.01) |
| *H04N 17/02* | (2006.01) |
| *H04L 27/38* | (2006.01) |

(52) U.S. Cl.
CPC .............. *H04B 17/006* (2013.01); *H04N 17/02* (2013.01); *H04L 27/38* (2013.01)

(58) Field of Classification Search
CPC ................................. H04L 27/38; H04L 27/34
USPC .................. 375/261, 130, 262, 320; 370/252
See application file for complete search history.

(56) References Cited

U.S. PATENT DOCUMENTS

| | | | |
|---|---|---|---|
| 2003/0149991 A1* | 8/2003 | Reidhead et al. | ............. 725/119 |
| 2008/0123788 A1 | 5/2008 | Wongwirawat et al. | |
| 2010/0290565 A1* | 11/2010 | Cheong | ......................... 375/320 |

OTHER PUBLICATIONS

Bornoosh, B. et al: "Design and Analysis of a Reduced Phase Error Digital Carrier Recovery Architecture for High-Order Quadrature Amplitude Modulation Signals", IET Communications, vol. 4, No. 18, Dec. 17, 2010, pp. 2196-2207, XP006036920.
Hranac, R.: "BER and MER Fundamentals", 2007, pp. 1-90, XP002700053, retrieved from the Internet: URL: http://www.jdsu.com/productliterature/digital_qam_signals_overview_and_basics_oftesting.pdf, retrieved on Jun. 11, 2014.
Parker, G. et al: "Techniques for the Blind Estimation of Signal to Noise Ratio for Quadrature Modulated Signals", Proceedings, Main Symposium/ISSPA 96, Fourth international Symposium on Signal Processing and Its Applications, Aug. 20-25, 1996, Queensland, Australia: 3 Tutorials in Communication, Speech and Image Processing, Aug. 30, 1996, pp. 238-241, XP032306386.

(Continued)

*Primary Examiner* — Khai Tran
(74) *Attorney, Agent, or Firm* — Marger Johnson & McCollom PC; Michael A. Nelson

(57) ABSTRACT

Described are systems and methods of estimating a Signal-to-Noise (S/N) ratio of an input channel carrying a QAM signal. A Modulation Error Ratio (MER) is calculated for the input QAM signal, but uses only the centermost error values of a constellation of the input QAM signal in generating this modified MER. The modified MER accurately represents the S/N ratio of the input channel carrying the QAM signal. In this way the S/N ratio may be accurately determined using only the received I and Q components of the modulated QAM input signal itself.

12 Claims, 9 Drawing Sheets

(56) References Cited

OTHER PUBLICATIONS

"White Paper: Digital Transmission: Carrier-to-Noise Ratio, Signal-to-Noise Ratio, and Modulation Error Ratio", Jan. 31, 2012, XP055122255, Retrieved from the Internet: URL: http://www.broadcom.com/collateral/wp/CMTS-WP101-R.pdf., retrieved on Jun. 10, 2014.

"White Paper: QAM Overview and Troubleshooting Basics for Recently Digital Cable Operators How is QAM Created?", XP055122832, Retrieved from the Internet: URL: http://www.jdsu.com/productliterature/digital_qam_signals_overview_and_basics_oftesting.pdf., retrieved on Jun. 11, 2014.

European Search Report and Written Opinion for Application No. 13181552.4, dated Jun. 23, 2014, 9 pages.

* cited by examiner

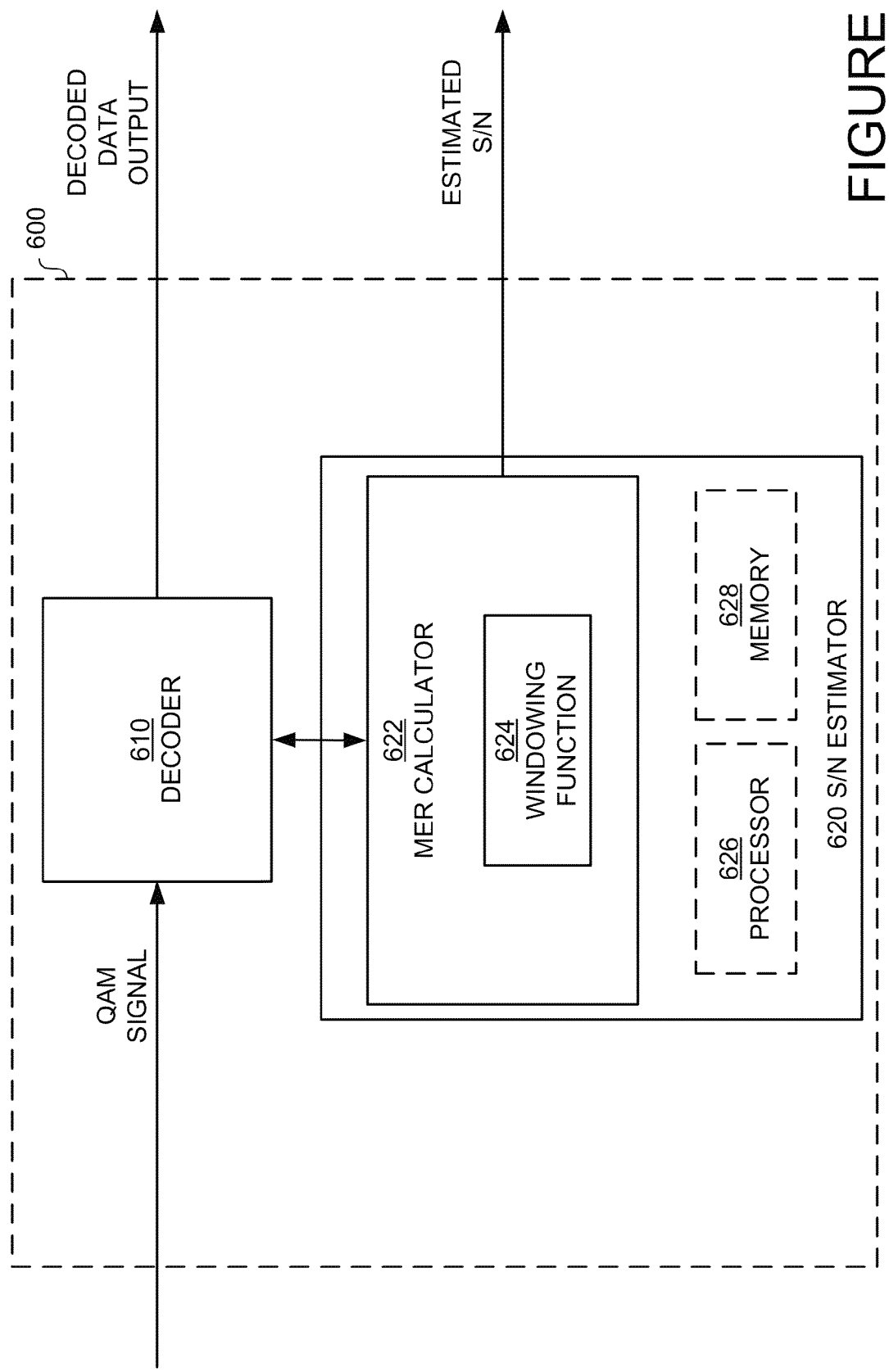

MEASURING CHANNEL SIGNAL TO NOISE METRIC USING CONSTELLATION DATA

CROSS REFERENCE TO RELATED APPLICATIONS

This disclosure is a non-provisional of and claims benefit to U.S. Provisional Application 61/692,705, filed Aug. 24, 2012, which is incorporated by reference herein.

FIELD OF THE INVENTION

This disclosure is directed to systems and methods for measuring quality metrics in television receivers, and, more particularly, to systems and methods for determining transmission channel signal-to-noise ratios.

BACKGROUND

Cable television providers receive multiple streams of compressed program data and then multiplex them into one of many outgoing QAM signals for distribution to users. In some cable television headends, for example, a single modulator may take as many as 8 or more incoming programs and combine them into a single outgoing RF QAM signal RF channel. In newer modulators many more incoming programs can be combined into multiple outgoing RF QAM signals on multiple channels. In the home, by selecting a particular program for viewing, the user effectively selects a desired RF channel on a Set Top Box (STB), which demodulates the received QAM signal on the selected channel to recover one of the compressed programs, and then decodes the selected program that the user wishes to view/hear.

It is desirous for a signal distribution company, such as the cable television company, to know various transmission parameters from reception through final delivery to the user. These parameters are useful, for example, to determine a source of signal degradation. For example, if cable subscribers receive a poor signal, they may contact the cable company to complain. In response, the cable company may measure or check performance metrics of the signals and the equipment along the various stages within the cable company to determine the source of the problem.

Signal to noise (S/N) ratios are an important metric to accurately characterize signal quality for digital QAM reception. IQ quadrature modulation is a method of modulating a carrier wave with two base-band input signals to produce a QAM signal. The two signals are oftentimes referred to as I (in-channel) and Q (quadrature-phase) components. IQ modulators are well known in the field of RF and microwave communications, finding use in both analog and digital modulation formats.

S/N ratios of a channel carrying an input QAM signal may be directly measured by using a spectrum analyzer. Spectrum analyzers may be relatively expensive, however, or otherwise unavailable to a cable television headend. Additionally, a spectrum analyzer requires a trained operator, who may not be available when the measurement is needed.

Although a Modulation Error Ratio (MER), described below, of QAM signals may be relatively easy to calculate from a received QAM signal's I and Q components, and although the MER may be related to the S/N of the channel, there is no known way to determine, from the demodulated I and Q components alone, the S/N of a channel carrying a QAM signal, the channel thus requiring measurement of the S/N of the channel before demodulation.

Embodiments of the invention address these and other limitations of the prior art.

SUMMARY OF THE INVENTION

Aspects of the invention include a method of estimating a Signal-to-Noise (S/N) ratio of an input channel carrying a QAM signal, the QAM signal having a defined number of ideal values in the demodulated I and Q components. In some embodiments the method comprises receiving the QAM signal from the input channel. Next, the decoded I and Q constellation of component QAM values from the QAM signal are compared to expected ideal constellation values to determine error values for a selected group of constellation ideal values. In some embodiment the selected group of constellation ideal values have a fewer number of values than the defined number of ideal values for the QAM signal constellation. In some embodiments the selected group of ideal constellation values are taken from the centermost of the constellation ideal values. Next, the method determines a modified Modulation Error Ratio (MER) for the input signal using error values that correspond only to the selected group of constellation ideal values. Finally, the modified MER ratio is set as the S/N ratio of the input channel carrying the QAM signal.

Other aspects may include a test and measurement device for estimating a Signal-to-Noise (S/N) ratio of an input channel carrying a QAM signal. The test and measurement device includes an input for receiving and demodulating the QAM signal constellation of I and Q values. It further includes an error value calculator structured to compare a received constellation of values to an ideal constellation of values and generate an error value. A Modulation Error Ratio (MER) calculator portion of the test and measurement device includes a selectable window limiter. Using the selectable window limiter, the MER calculator is structured to calculate a modified MER of the input channel carrying the QAM signal based on only a particular subset of the error values generated by the error value calculator. In some embodiments only the centermost error values of the constellation are used. For example, in a 64 bit QAM constellation, the window limiter may limit the MER calculator to using only the centermost 4 values in calculating the modified MER. The modified MER represents the S/N ratio of the input channel carrying the QAM signal with sufficient accuracy

BRIEF DESCRIPTION OF THE DRAWINGS

FIG. 9 is a block diagram of a test and measurement device including an S/N estimator according to embodiments of the invention.

DETAILED DESCRIPTION

Figure 1:
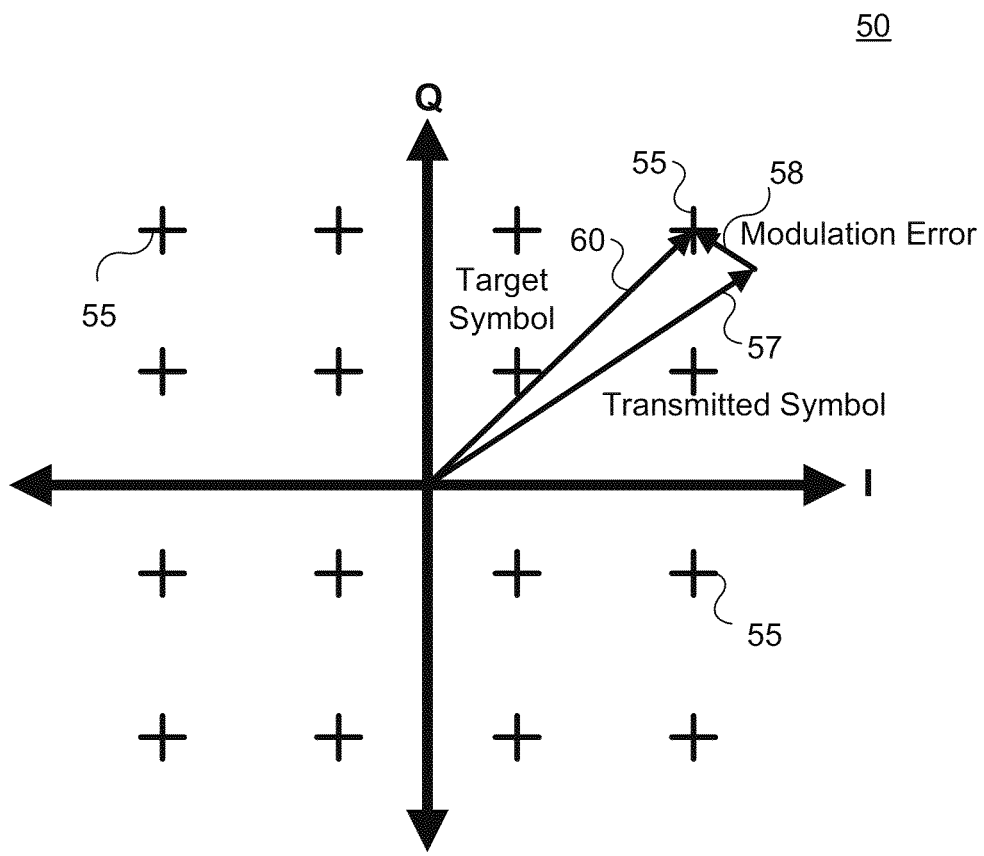
FIG. 1 is an example conventional constellation diagram illustrating the difference between a target symbol vector and a received symbol vector.

FIG. 1 is a diagram of a constellation diagram 50 for I and Q parameters of a QAM-16 signal. It is known as a QAM-16 because there are 16 possible data points 55, the ideal indications of which are indicated by crosses. An ideal decoded 16-QAM digitally modulated signal would have each received symbol land exactly in the center of one of the 16 crosses of FIG. 1. Deviation from these locations is distortion that has been introduced to the received signal somewhere along the path of the signal including the receiver itself. Real-world impairments, primarily channel noise, linear distortion, local oscillator phase-noise, cause most of the symbol landing points to land at a point different than the ideal. For example, an ideal target symbol vector 60 would land in the center of a data point 55 at the upper-right hand corner of the constellation diagram 50, but instead the received symbol vector 57 missed the data point 55. Modulation error 58 for a decoded data vector, as illustrated in FIG. 1, is the vector difference between the ideal target symbol vector 60 and the received symbol vector 57. The Modulation Error Ratio (MER), described in more detail below, is the ratio of average symbol power to average error power.

Figure 2:
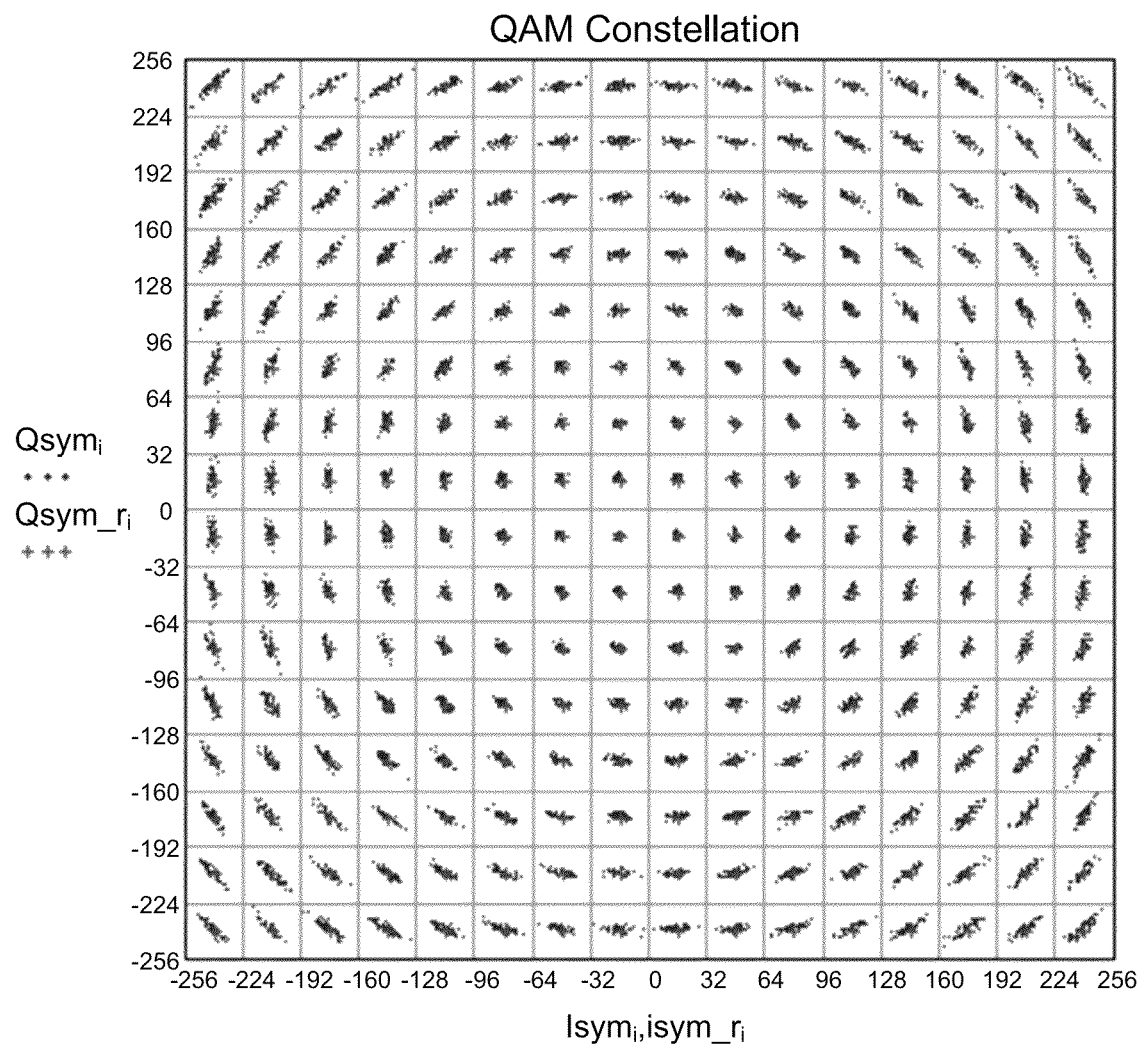
FIG. 2 is a conventional constellation diagram of a QAM-256 plotting 32 samples for each of the 256 symbol landing points.

When a constellation diagram is used to plot the landing points of a given symbol over time, the resulting display forms a small "cloud" of symbol landing points rather than a single point. FIG. 2 is an example constellation diagram 100 of a QAM-256 illustrating this concept where 32 samples are plotted for each of the 256 symbol landing points.

Typically, the linear distortions in the input signal are removed by the receiver equalizer. This means the main contribution to the target-error for each point from the ideal locations within the constellation is the noise added to the signal and the local oscillator phase noise. Inexpensive tuners or down-converters generally have considerable local oscillator phase-noise, which can be seen in FIG. 2 as the angular or arc observed in the constellation data points.

In many cases the receiver's equivalent input noise is negligible due to the relatively large input signal level and use of a high quality and low phase-noise local oscillator. In this case, the dominant noise component is the input channel noise. The input S/N of the received CATV (Cable Television) signal is calculated using an estimation of this input channel noise in cases when it is not possible or inconvenient to directly measure the input S/N. In some cases, the only data available for computing the S/N of the received QAM signal is the received I and Q components of the modulated QAM input signal itself.

The S/N can be computed from each I and Q pair as follows:

$$MERv := \frac{\sum_i [(Isym\_r_i)^2 + (Qsym\_r_i)^2]}{\sum_i [(\delta I_i)^2 + (\delta Q_i)^2]}$$

Isym_r(i) and Qsym_r(i) are the target (ideal) sample points for each constellation point indexed by i. The deltaI(i) and deltaQ(i) are the error values in the I and Q dimension for each received I and Q pair indexed by i.

The result is known as the Modulation Error Ratio (MER) value and is equivalent to the S/N in cases where the linear distortions (group-delay error and multipath), local oscillator phase-noise and other distortions are removed or are negligible. It is often computed as 10*log(MERv) with the result in dB.

Figure 3:
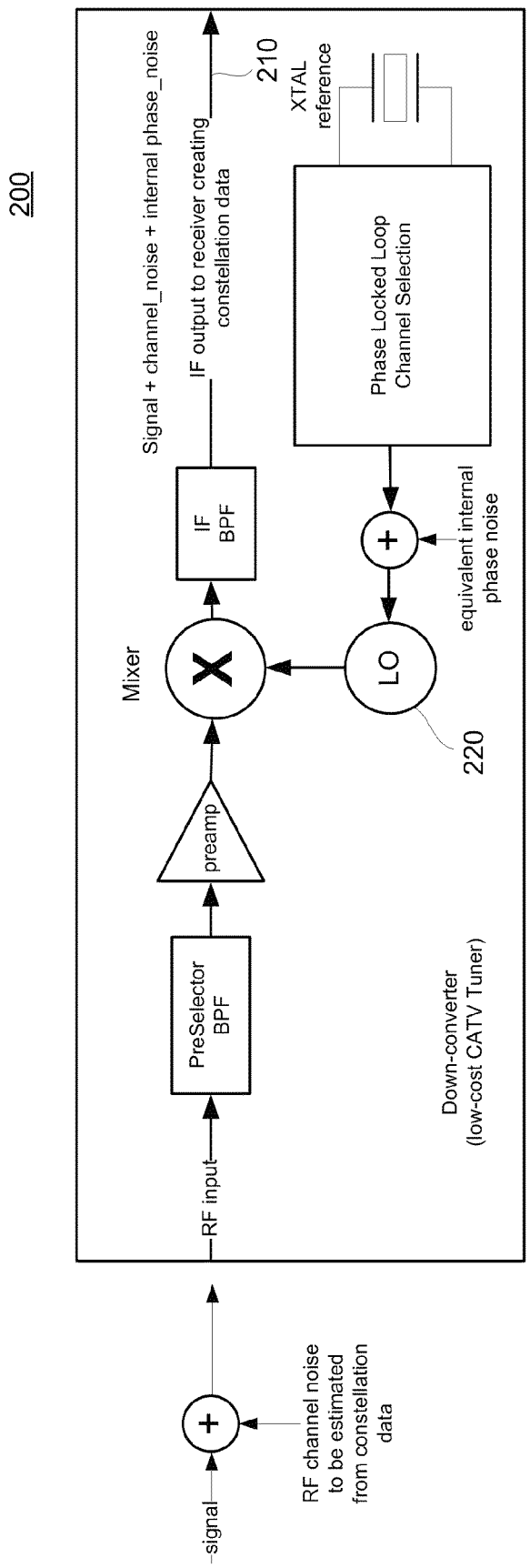
FIG. 3 is a block diagram of a conventional low-cost tuner or down-converter.

As mentioned above, receivers with low-cost input tuners or down converters, as shown in FIG. 3, may have considerable local oscillator phase-noise. For example, referring to FIG. 3, the output 210 of a tuner 200 contains both the phase-noise of the tuners own internal local local-oscillator 220 as well as the input channel noise. As mentioned above, this phase-noise can be seen in the constellation of FIG. 2 as the angular or arc in the constellation data points.

The phase-noise of the local-oscillator 220 adds to the target-error, making the estimated S/N from the MERv calculation seem much worse than the actual input S/N. Embodiments of the invention mitigate the effect of the phase noise from the MER computation, so that the estimated S/N from the MERv calculation may more closely represent the actual input S/N of the input signal. This allows a relatively accurate S/N of the input to be determined without necessitating a direct measurement.

Embodiments of the invention use data from only a portion of the constellation values to compute the MER to when estimating the S/N, which minimizes the contribution of the tuner's own phase-noise. This makes for a more accurate S/N estimate. In preferred embodiments only the center constellation values are used to compute the MER. For example, with reference to FIG. 4, only the center values 320 of the QAM-256 constellation 300 are used in computing the MER. Although four values 320 are included in the embodiment illustrated in FIG. 4, a different number of values may be used according to implementation details.

Embodiments of the invention may use the following function:

$$SNhat(Ir, Qr, dI, dQ, R, LP2M, LS) := \begin{array}{|l} I \leftarrow \text{length}(Ir) \\ j \leftarrow 0 \\ D_0 \leftarrow .01 \\ \text{for } i \in 0 \ldots I-1 \\ \quad \text{if } (|Ir_i| < R) \cdot (|Qr_i| < R) \\ \quad \quad \begin{array}{|l} j \leftarrow j + 1 \\ D_j \leftarrow (dI_i)^2 + (dQ_i)^2 D_{j-1} \end{array} \\ SN \leftarrow -10 \cdot \log\left(\frac{D_j}{j}\right) - \\ LP2M + LS \\ SN \end{array}$$

Ir and Qr are the vectors of the ideal target values for a particular constellation.

dI and dQ are vectors of the target error values

R is the window size isolating the center-most values of the constellation. For example, R may ignore all but the centermost 4 constellation points when estimating the S/N. For 9-bit I and Q data, a value of R=32 can be used to isolate the four center values. Other R values are possible, and the best value for R may best be empirically derived for a particular system.

LP2M is the log of the peak-to-mean ratio for the constellation (for example, 3.677 dB for QAM-64 and 4.212 dB for QAM-256). The values are available from QAM CATV standards documents.

LS is the log of the peak constellation relative power. For 9-bit quantized constellation I and Q data, the relative peak power for QAM-256 is 50.6 dB.

For example, for 9-bit data N=9, the value is computed as follows:

$$LS=(20*N-10)*\log(2)+20*\log(1-2^{-4})$$

$$LS=50.615 \text{ dB}$$

In more detail;

LS is defined as the peak constellation power in dB. The equation for the square of the vector length (peak power) to any corner point can be derived as follows:
LS=10*log(Xc^2+Yc^2), Xc and Yc are coordinates of one of the 4 corner targets in a square constellation. The negative sign on a corner coordinate may be ignored since it is squared in the previous equation.

Since Xc=Yc for the corners, $$LS=10*\log(2*Xc^2), \text{ in dB.}$$

Figure 4:
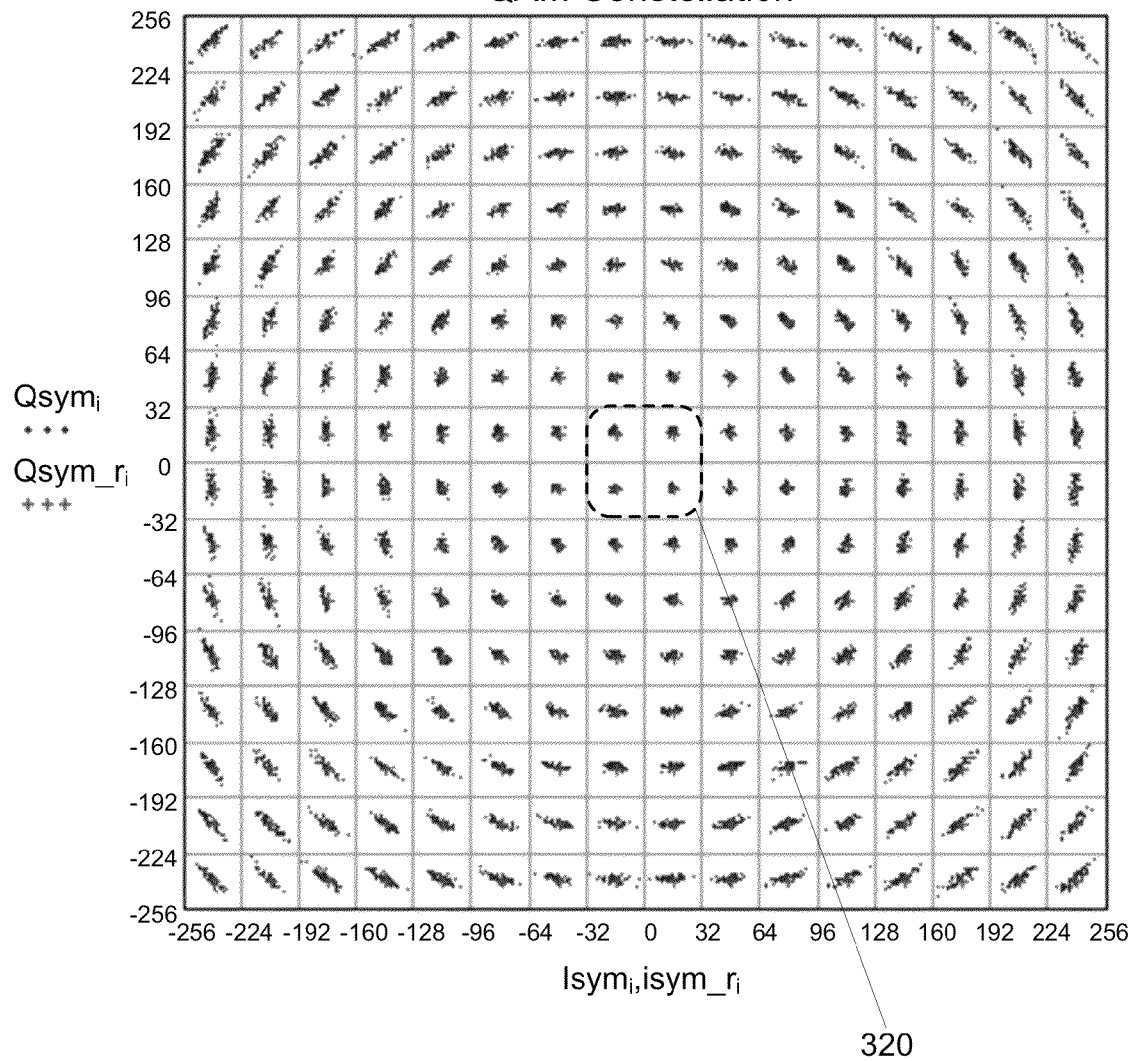
FIG. 4 is a constellation diagram of a QAM-256 plotting 32 samples for each of the 256 symbol landing points and including a windowing function for estimating an S/N value according to embodiments of the invention.

So, for an N-bit square constellation of size $2^r$ by $2^r$ target points as shown in FIG. 4 where r=4, the value of Xc can be computed, in units of LSB's, as follows:

By inspection of the constellation corner value, $$Xc=2^{(N-1)}-(2^{(N-1)})/2^{(r-1)}*\tfrac{1}{2}=2^{(N-1)}*(1-2^{-r}),$$

$$2*Xc^2=2^{(2*N-1)}*(1-2^{-r})^2$$

Therefore, by substitution;

$$LS=10*\log(2^{(2*N-1)}*(1-2^{-r})^2),$$

$$LS=(20*N-10)*\log(2)+20*\log(1-2^{-r})$$

As an example, for N=9 bits and QAM256, r=4, therefore, $$LS=(20*N-10)*\log(2)+20*\log(1-2^{-4})=50.615 \text{ dB}$$

Similarly, for QAM64, r=3, therefore, $$LS=(20*N-10)*\log(2)+20*\log(1-2^{-3})=50.015 \text{ dB}$$

Note that the lengths of the vectors Ir, Qr, dI and dQ, which are one-dimensional arrays, are all the same. The elements of these arrays arrive in real time from the decoder hardware and are generally buffered into a storage register. Therefore, their length is determined by the size of this buffer. This size is determined by the arrival rate and the preferred update rate of the subsequent computed S/N readout. Larger arrays, i.e, larger buffer sizes, would give less variance in the S/N estimate since all the constellation points arrive with essentially random locations due to the QAM channel coding.

The SNhat function set forth above can then be used to estimate the S/N according to embodiments of the invention, and the result is shown below:

$$SNhat(Isym\_r,Qsym\_r,\delta I,\delta Q,32,4.212,50.6)=41.8 \text{ dB}$$

Without truncating some of the constellation values by using the R-windowing function as described above, the S/N value from the MER calculation for the data shown in FIG. 2 would be calculated as 34.4 dB, whereas, using the R-windowing function as illustrated in FIG. 4 yields 41.8 dB. The measured input S/N is 42.1 dB, which gives an estimate error of about 8 dB for the conventional method of using the MER to estimate S/N, whereas estimate error using embodiments of the invention gives an error of only 0.3 dB.

Figure 5:
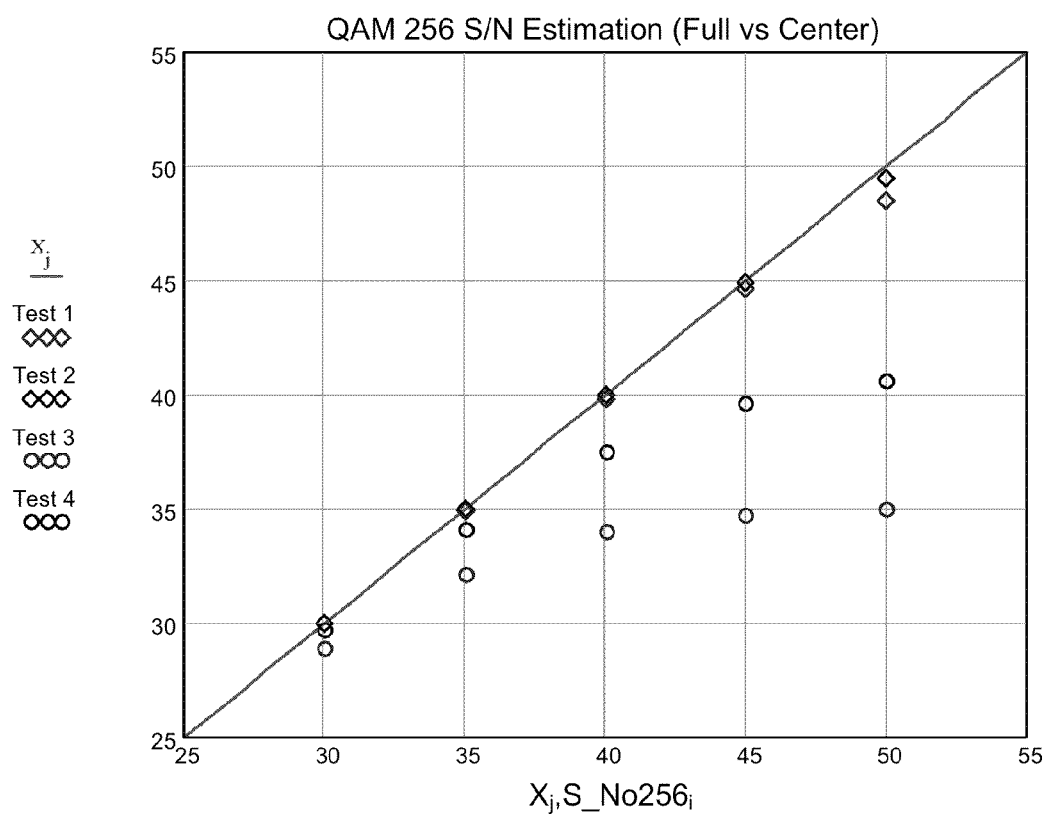
FIG. 5 is plot of conventionally determined S/N values as well as S/N values determined according to embodiments of the invention for a QAM-256 input signal.

Data was taken over a range of known input S/N's and a conventional method of estimating the S/N from the MER was compared for tuner phase-noise values of 1.0 and 0.5 deg RMS as plotted in FIG. 5. The input S/N is on the x-axis.

Figure 6:
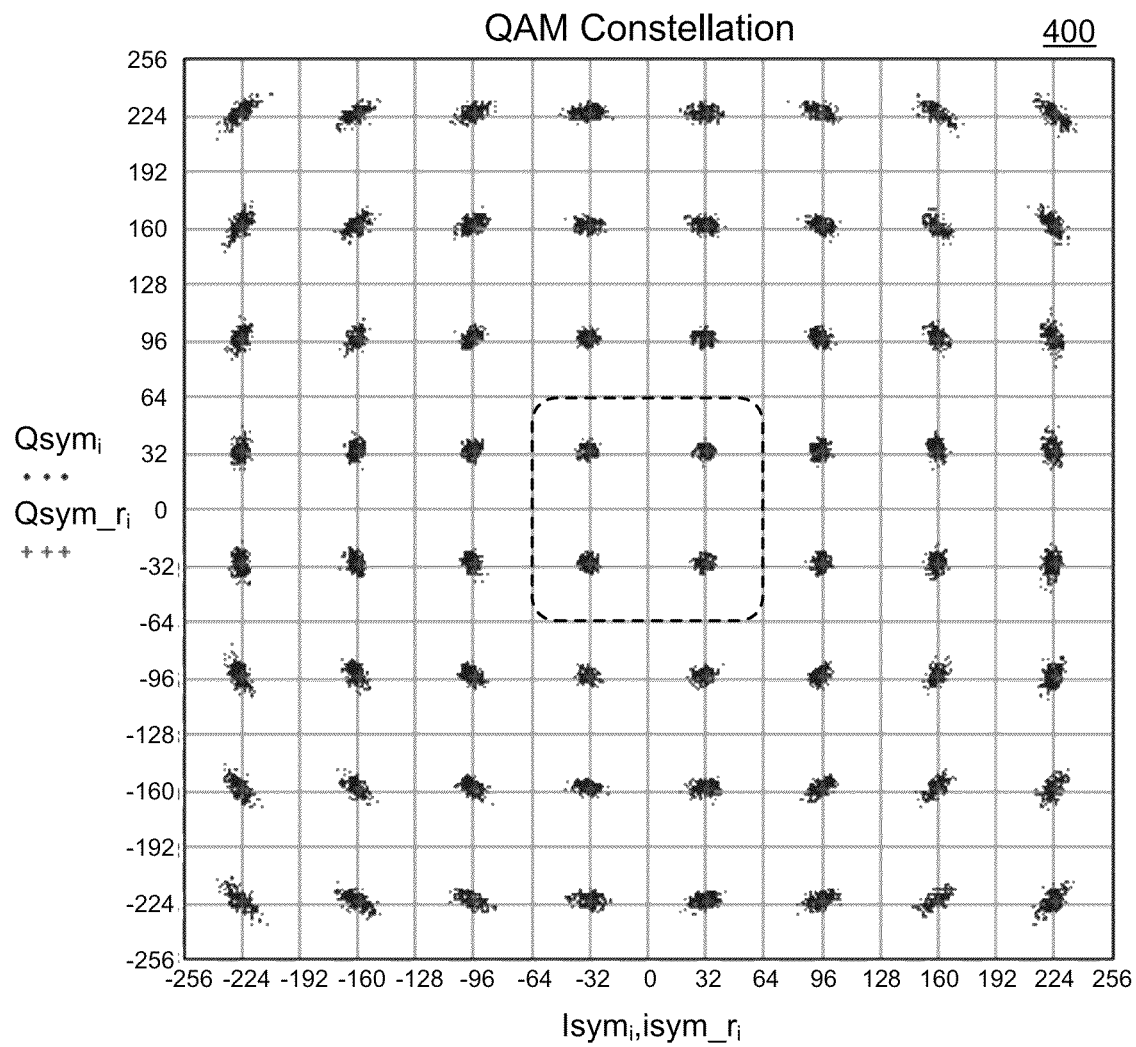
FIG. 6 is a constellation diagram of a QAM-64 plotting samples for each of the 64 symbol landing points and including a windowing function for estimating a S/N value according to embodiments of the invention.

The diamonds of Tests 1 and 2 illustrated in the plot of FIG. 5 are S/N values calculated using embodiments of the invention, with limited use of constellation target errors, and the 0's of Tests 3 and 4 are the estimated S/N values using conventional methods, which use all of the constellation target errors in computing the values. Tests 1 and 3 has a tuner phase-noise of 0.5 deg RMS and Tests 2 and 4 has a tuner phase-noise of 1 deg RMS. The X and Y axis are in dB and the solid line at 45 deg represents a locus of perfect S/N estimations Similar S/N from the MER were again computed for the case of a 9-bit QAM-64 constellation 400 illustrated in FIG. 6, and the result comparing calculations using embodiments of the invention (Test 5 and Test 6) to those using conventional methods (Test 7 and Test 8) is plotted in FIG. 7. Tests 5 and Test 7 has a tuner phase-noise of 0.5 deg RMS, and Test 6 and Test 8 have a tuner phase-noise of 1 deg RMS. The X and Y axis are in dB and the solid line at 45 deg represents a locus of perfect S/N estimations.

Figure 7:
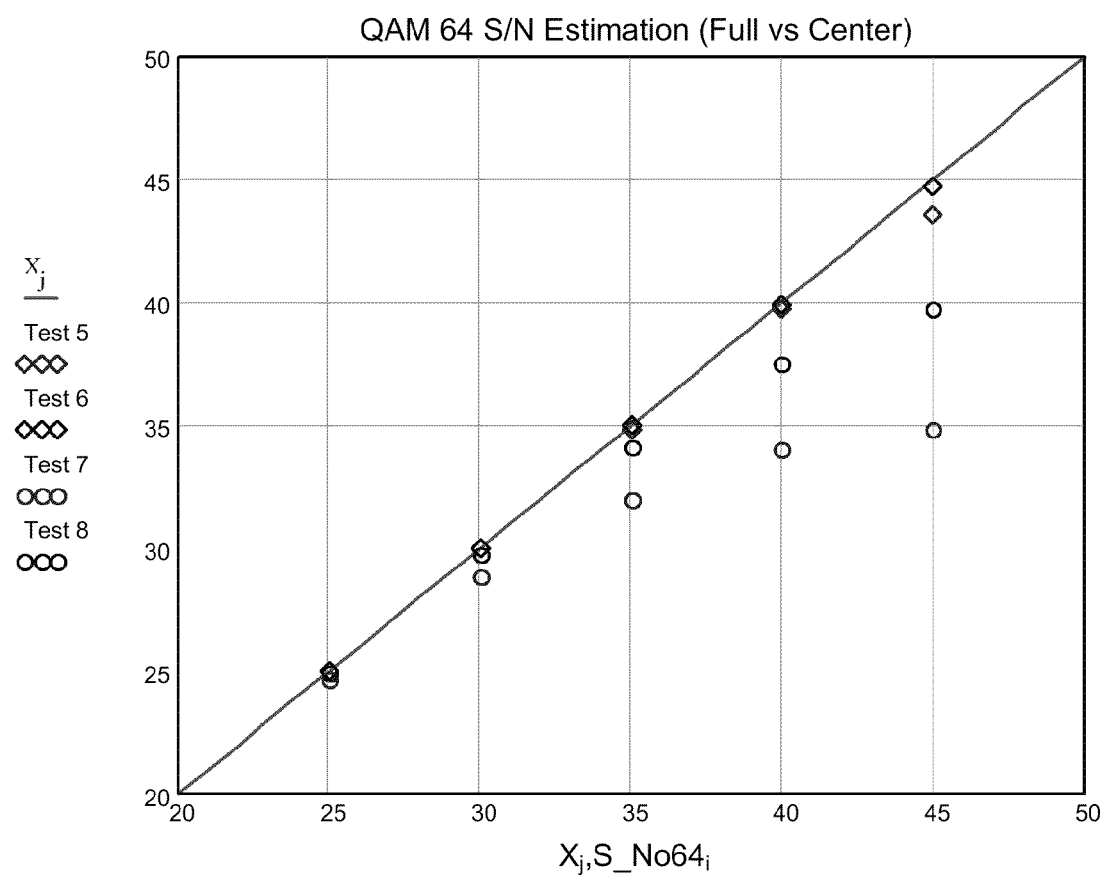
FIG. 7 is plot of conventionally determined S/N values as well as S/N values determined according to embodiments of the invention for the QAM-64 input signal of FIG. 6.

As shown in FIG. 5, the S/N estimation error for a 45 dB input S/N is reduced from 10 dB to within 1 dB with QAM-256 by utilizing embodiments of the invention. Similarly, as shown in FIG. 7, the S/N estimation error for a 45 dB input S/N is reduced from 10 dB to within 2 dB with QAM-64 and when utilizing embodiments of the invention.

In some embodiments, the error values recovered from the received constellation data may be batch processed to allow continuous, periodically updated, S/N estimates that can subsequently be averaged to provide a more stable S/N readout.

Note also that embodiments of the invention reduce the sensitivity of the constellation S/N estimate to all local-oscillator phase noise contributors in the CATV RF distribution chain (i.e. modulator, channel converters, etc) as well as the low-cost tuner in the measurement receiver.

Figure 8:
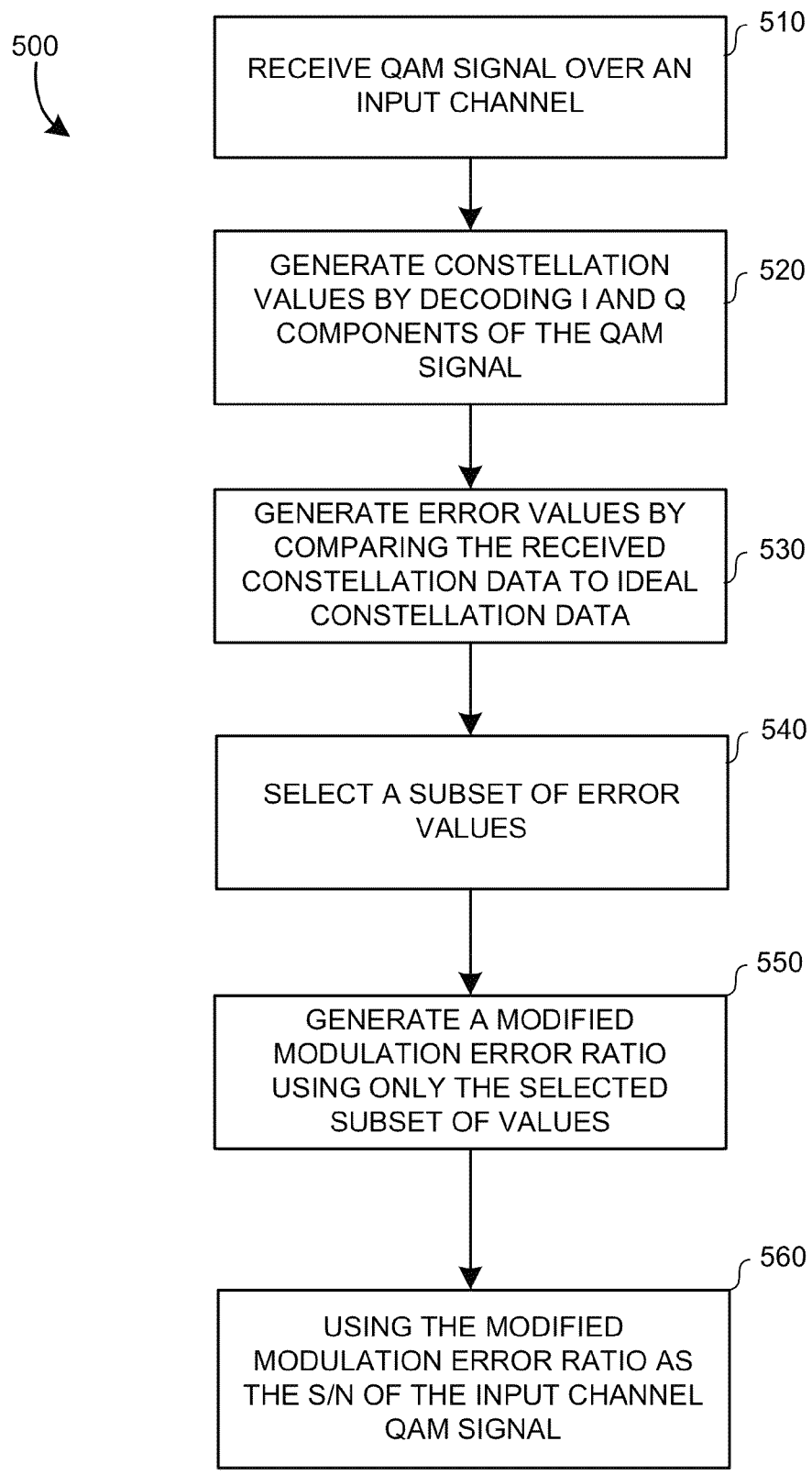
FIG. 8 is an example flow diagram illustrating operations used in embodiments of the invention.

FIG. 8 is an example flow diagram illustrating operations used in embodiments of the invention. In a flow 500, a QAM signal is received over an input channel in an operation 510. Next, a constellation is generated by decoding I and Q values from the QAM signal in an operation 520. Error values are created by comparing the decoded I and Q values in the constellation to ideal values in an operation 530. Embodiments of the invention use a selected subset of these error values in creating a modified MER in operations 540 and 550. The particular error values used are chosen to minimize local effects, as described above. This modified MER is an accurate measurement of the S/N ratio of the input channel QAM signal as set forth in operation 560.

FIG. 9 is a block diagram of a test and measurement device including a S/N estimator according to embodiments of the invention. The test and measurement device 600 may be an RF monitor, for instance, or another instrument that analyzes QAM signals. An input receives a QAM signal for testing and is decoded into its I and Q components in a decoder 610. The decoder builds a constellation of the decoded QAM signal. A Modulation Error Ratio (MER) calculator 622 includes a windowing function 624 that is used to select only a portion of the error values in generating the MER for the QAM signal. For instance, the windowing function 624 may select the inner-most ideal constellation values for inclusion in the modified MER, and may specifically exclude constellation values that appear more near the edges of the constellation, which may include more local effects, such as phase noise. The modified MER that is calculated may be used as a very accurate estimate of the S/N of the input channel QAM signal.

Embodiments of the invention may use a processor 626 and data and or instruction memory 628 in performing the functions used to create the S/N. In other embodiments, specialized hardware may be used. In still further embodiments, programmable hardware such as an FPGA or other processors may be used depending on the implementation details of the test and measurement device.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A method of estimating a Signal-to-Noise (S/N) ratio of an input channel carrying a QAM signal, the QAM signal having a defined number of ideal values in demodulated I and Q components, the method comprising:
   receiving the QAM signal from the input channel;
   comparing decoded values from a constellation of a decoded QAM signal to ideal constellation values to determine error values for a selected group of constellation ideal values, the selected group of constellation ideal values having a fewer number of values than the defined number of ideal values for the QAM signal constellation;
   determining a modified Modulation Error Ratio (MER) for the input received QAM signal using error values that correspond only to the selected group of constellation ideal values; and
   ascribing the modified MER ratio as the S/N ratio of the input channel carrying the QAM signal.

2. The method of estimating a Signal-to-Noise (S/N) ratio of an input channel carrying a QAM signal according to claim 1, further comprising:
   demodulating the received QAM signal into I and Q component values.

3. The method of estimating a Signal-to-Noise (S/N) ratio of an input channel carrying a QAM signal according to claim 1, in which the selected group of constellation ideal values includes only the center-most of the ideal values of the constellation.

4. The method of estimating a Signal-to-Noise (S/N) ratio of an input channel carrying a QAM signal according to claim 3, in which the QAM signal constellation has 256 ideal values, and in which there are four ideal values in the selected group of constellation ideal values.

5. The method of estimating a Signal-to-Noise (S/N) ratio of an input channel carrying a QAM signal according to claim 3, in which the QAM signal constellation has 64 ideal values, and in which there are four ideal values in the selected group of constellation ideal values.

6. The method of estimating a Signal-to-Noise (S/N) ratio of an input channel carrying a QAM signal according to claim 1, in which determining a MER comprises:
   factoring for a peak constellation relative power for the received QAM signal constellation.

7. The method of estimating a Signal-to-Noise (S/N) ratio of an input channel carrying a QAM signal according to claim 6, in which determining a MER further comprises:
   factoring for a peak-to-mean ratio for the received QAM signal constellation.

8. A test and measurement device for estimating a Signal-to-Noise (S/N) ratio of an input channel carrying a QAM signal, comprising:
   an input for receiving the QAM signal;
   a demodulator for demodulating the QAM signal into a constellation of I and Q component values;
   an error value calculator structured to compare the demodulated constellation of I and Q component values to an ideal set of values for the QAM constellation and generate an error value;
   a Modulation Error Ratio (MER) calculator including a selectable window limiter, the MER calculator structured to calculate a modified MER of the input channel carrying the QAM signal based on only particular of the error values generated by the error value calculator; and
   an ascriber structured to ascribe the modified MER of the input channel carrying the QAM signal as the S/N ratio of the input channel carrying the QAM signal.

9. The test and measurement device for estimating a Signal-to-Noise (S/N) ratio of an input channel carrying a QAM signal according to claim 8, in which the window limiter selects only the centermost error values from the QAM signal constellation to pass to the MER calculator.

10. The test and measurement device for estimating a Signal-to-Noise (S/N) ratio of an input channel carrying a QAM signal according to claim 9 in which the QAM signal constellation comprises 256 ideal values and in which the window limiter selects error values derived only from the centermost four ideal values.

11. The test and measurement device for estimating a Signal-to-Noise (S/N) ratio of an input channel carrying a QAM signal according to claim 9 in which the QAM signal constellation comprises 64 ideal values and in which the window limiter selects error values derived only from the centermost four ideal values.

12. The test and measurement device for estimating a Signal-to-Noise (S/N) ratio of an input channel carrying a QAM signal according to claim 9 in which the test and measurement device is an RF monitor.

* * * * *

UNITED STATES PATENT AND TRADEMARK OFFICE
CERTIFICATE OF CORRECTION

| | |
|---|---|
| PATENT NO. | : 9,001,912 B2 |
| APPLICATION NO. | : 13/971736 |
| DATED | : April 7, 2015 |
| INVENTOR(S) | : Baker et al. |

It is certified that error appears in the above-identified patent and that said Letters Patent is hereby corrected as shown below:

<u>In the Claims</u>

In column 7, line 43, delete "input".

Signed and Sealed this
Sixteenth Day of February, 2016

Michelle K. Lee
*Director of the United States Patent and Trademark Office*